United States Patent
Kweon

(10) Patent No.: US 12,225,491 B2
(45) Date of Patent: Feb. 11, 2025

(54) METHOD AND APPARATUS FOR REGISTRATION AND PROTOCOL DATA UNIT SESSION ESTABLISHMENT FOR ONBOARDING OF USER EQUIPMENT IN MOBILE COMMUNICATION SYSTEM

(71) Applicant: Samsung Electronics Co., Ltd., Suwon-si (KR)

(72) Inventor: Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 17/864,838

(22) Filed: Jul. 14, 2022

(65) Prior Publication Data

US 2023/0043899 A1 Feb. 9, 2023

(30) Foreign Application Priority Data

Aug. 9, 2021 (KR) .................. 10-2021-0104915

(51) Int. Cl.
*H04W 60/00* (2009.01)
*H04W 76/10* (2018.01)

(52) U.S. Cl.
CPC .......... *H04W 60/00* (2013.01); *H04W 76/10* (2018.02)

(58) Field of Classification Search
CPC ............................ H04W 60/00; H04W 76/10
USPC .................................................... 455/435.1
See application file for complete search history.

(56) References Cited

U.S. PATENT DOCUMENTS

| 2019/0387576 | A1 | 12/2019 | Yang et al. |
| 2021/0058784 | A1 | 2/2021 | Kedalagudde et al. |
| 2021/0127254 | A1 | 4/2021 | Ben Henda et al. |
| 2022/0360493 | A1* | 11/2022 | Sung ............ H04W 12/35 |
| 2022/0360985 | A1* | 11/2022 | Lin ............... H04W 48/18 |

OTHER PUBLICATIONS

3GPP TS 23.503, 3rd Generation Partnership Project; Technical Specification Group Services and System Aspects; Policy and charging control framework for the, 5G System (5GS); Stage 2 (Release 17), Jun. 2021.

(Continued)

*Primary Examiner* — Mark G. Pannell
(74) *Attorney, Agent, or Firm* — Jefferson IP Law, LLP

(57) ABSTRACT

A method for an access and mobility management function (AMF) to register a user equipment (UE) and establish a session in a standalone non-public network (SNPN) is provided. The method includes receiving a registration request message from the UE through a base station, wherein the registration request message includes an onboarding indication, an onboarding subscriber concealed identifier (SUCI) set to "SNPN onboarding," and default UE credentials, selecting a session management function (SMF) to establish a restricted protocol data unit (PDU) session for remote provisioning of the UE, transmitting a PDU session establishment request message to the selected SMF, receiving a PDU session establishment response message including information indicating PDU session establishment acceptance and a PDU session identifier (ID) from the SMF, and transmitting a message indicating UE registration and PDU session establishment acceptance to the UE through the base station.

16 Claims, 5 Drawing Sheets

(56) References Cited

OTHER PUBLICATIONS

3GPP; TSG SA; "3rd Generation Partnership Project; Technical Specification Group Services and System Aspects, Procedure for the 5G system (5GS); Stage 2 (Release 17)," 3GPP TS 23.502 V17.1.0.
OPPO, "Onboarding indication over RRC and NAS," S2-2100690, 3GPP TSG-SA WG2 Meeting #143-e, E-Meeting.
International Search Report dated Oct. 19, 2022, issued in International Application No. PCT/KR2022/010271.

\* cited by examiner

METHOD AND APPARATUS FOR REGISTRATION AND PROTOCOL DATA UNIT SESSION ESTABLISHMENT FOR ONBOARDING OF USER EQUIPMENT IN MOBILE COMMUNICATION SYSTEM

CROSS-REFERENCE TO RELATED APPLICATION(S)

This application is based on and claims priority under 35 U.S.C. § 119(a) of a Korean patent application number 10-2021-0104915, filed on Aug. 9, 2021, in the Korean Intellectual Property Office, the disclosure of which is incorporated by reference herein in its entirety.

BACKGROUND

1. Field

The disclosure relates to a method and apparatus for registration of a user equipment (UE) and establishment of a protocol data unit (PDU) session in a communication system. More particularly, the disclosure relates to a method and apparatus for registration and PDU session establishment for UE onboarding in a non-public network (NPN).

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (millimeter wave (mmWave)) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the advancement of mobile communication systems as described above, various services can be provided. As one of these phenomena, discussions are also being made on how to use non-public networks (NPNs). Accordingly, there is a need for a method for efficiently using such an NPN.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus in a wireless communication system for effectively providing a service in a non-public network (NPN).

Another aspect of the disclosure is to provide a method and apparatus for registering a user equipment (UE) and establishing a protocol data unit (PDU) session in an NPN.

Another aspect of the disclosure is to provide a method and apparatus for registering a UE and establishing a PDU session, which can reduce waste of resources in a mobile communication system.

Additional aspects will be set forth in part in the description which follows and, in part, will be apparent from the description, or may be learned by practice of the presented embodiments.

In accordance with an aspect of the disclosure, a procedure of simultaneously creating a PDU session for receiving UE subscription data in an NPN when a UE without standalone non-public network (SNPN) credentials and subscription data registers with an onboarding network (ONN) to receive NPN subscription data is provided.

In accordance with another aspect of the disclosure, a method for an access and mobility management function (AMF) entity to register a user equipment (UE) and establish a session in a standalone non-public network (SNPN) is provided. The method includes receiving a registration request message from the UE through a base station, wherein the registration request message includes an onboarding indication, an onboarding subscriber concealed identifier (SUCI) set to "SNPN onboarding," and default UE credentials, selecting a session management function (SMF) entity to establish a restricted protocol data unit (PDU) session for remote provisioning of the UE, transmitting a PDU session establishment request message to the selected SMF entity, receiving a PDU session establishment response message including information indicating PDU session establishment acceptance and a PDU session identifier (ID) from the SMF entity, and transmitting a message indicating UE registration and PDU session establishment acceptance to the UE through the base station.

In accordance with another aspect of the disclosure, an access and mobility management function (AMF) entity for registering a user equipment (UE) and establishing a session in a standalone non-public network (SNPN) is provided. The AMF entity includes a transceiver configured to communicate with other network functions of the SNPN and the UE, a memory, and at least one processor, wherein the at least one processor may be configured to receive a registration request message from the UE through a base station, the registration request message including an onboarding indication, an onboarding subscriber concealed identifier (SUCI) set to "SNPN onboarding," and default UE credentials, select a session management function (SMF) entity to establish a restricted protocol data unit (PDU) session for remote provisioning of the UE, transmit a PDU session establishment request message to the selected SMF entity, receive a PDU session establishment response message including information indicating PDU session establishment acceptance and a PDU session identifier (ID) from the SMF entity, and transmit a message indicating UE registration and PDU session establishment acceptance to the UE through the base station.

According to the disclosure, it is possible to effectively provide a service in a non-public network (NPN) in a wireless communication system, and in particular, it is possible to provide a method and apparatus for registering a UE and establishing a PDU session in the NPN. Also, according to the disclosure, it is possible to reduce waste of resources in a mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
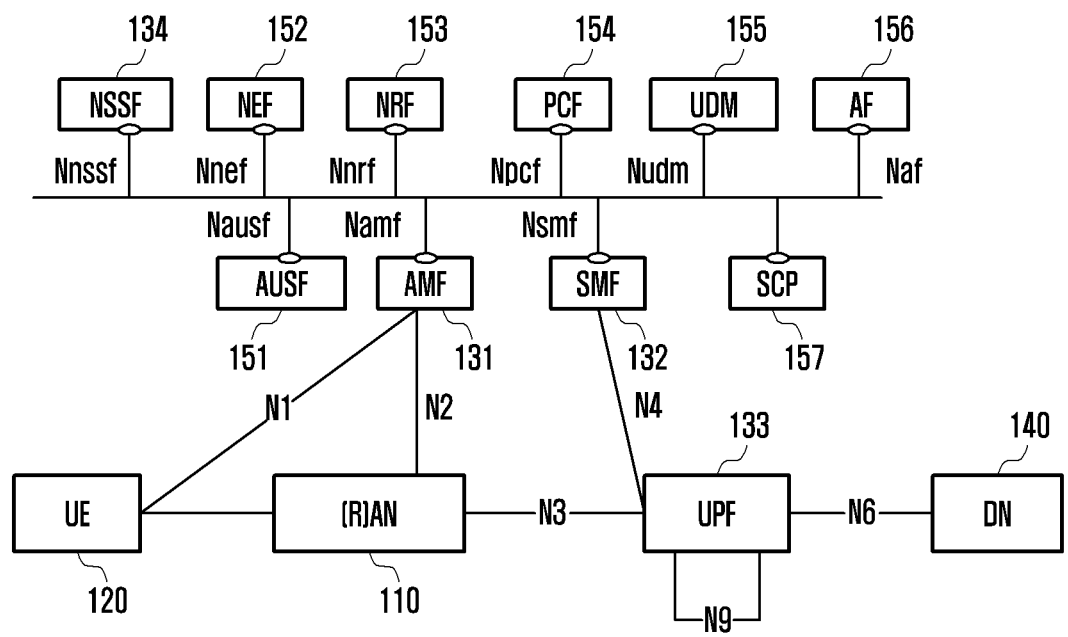
FIG. 1 is a diagram illustrating the architecture of a $5^{th}$ generation (5G) core network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and configurations may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Likewise, in the drawings, some elements are exaggerated, omitted, or only outlined in brief. Also, the size of each element does not necessarily reflect the actual size. The same reference symbols are used throughout the drawings to refer to the same or corresponding parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the specification to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Additionally, each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit," "module," or the like used in the embodiments may refer to a software component or a hardware component such as a field programmable gate array (FPGA) or application-specific integrated circuit (ASIC) capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Further, components and units may be implemented to drive one or more processors in a device or a secure multimedia card.

In the following description, the term "base station (BS)" refers to a main agent allocating resources to terminals and may be at least one of Node B, evolved Node B (eNode B) (eNB), next generation Node B (gNode B) (gNB), radio access unit, base station controller, or network node. The term "terminal" may refer to at least one of user equipment (UE), mobile station (MS), cellular phone, smartphone, computer, or multimedia system with a communication function. Also, the embodiments of the disclosure may be applied to other communication systems having a similar technical background or channel configuration to the embodiments of the disclosure described below. In addition, the embodiments of the disclosure may be applied to other communication systems through some modifications within a range that does not significantly depart from the scope of the disclosure on the basis of the judgement of a person skilled in the art.

Those terms used in the following description for identifying an access node, indicating a network entity or network function (NF), indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description below, some terms and names defined in the $3^{rd}$ generation partnership project (3GPP) long term evolution standards may be used. However, the disclosure is not limited by the above terms and names, and may be equally applied to systems conforming to other standards.

Embodiments of the disclosure propose a procedure for creating a protocol data unit (PDU) session to receive subscriber information at the same time as a procedure for a UE to register with an onboarding network (ONN) in order to receive subscriber information.

FIG. 1 is a diagram illustrating the architecture of a $5^{th}$ generation (5G) network according to an embodiment of the disclosure.

The description of the network entities or network nodes constituting the 5G network illustrated in FIG. 1 is as follows.

Referring to FIG. 1, a base station (radio access node, RAN) 110 and a user equipment (UE) 120 are shown as some of nodes using a radio channel in a 5G communication system. Only one RAN 110 and one UE 120 are shown in FIG. 1, but other base stations identical or similar to the RAN 110 may be further included. In addition, although only one UE 120 is shown in FIG. 1, it will be apparent to those skilled in the art that a plurality of UEs may be included in a base station.

The RAN 110 is a network infrastructure that provides radio access and allocates radio resources to the UE 120. The RAN 110 has a coverage defined as a specific geographic area based on a distance capable of transmitting a signal (not shown in FIG. 1). The RAN 110 may be at least one of base station, access point (AP), NodeB, eNodeB (eNB), 5th generation node (5G node), wireless point, transmission/reception point (TRP), next generation radio access network (NG-RAN), 5G-AN, radio access unit, base station controller, or network node.

The base station may also be called by other types of names described above. In addition, the base station may include one central unit (CU) and plural remote units (RUs) for actually transmitting a radio signal.

The UE 120 is a user device used by a user, and communicates with the RAN 110 through a radio channel. In some cases, the UE 120 may be operated without the user's involvement. For example, the UE 120 may be a device that performs machine type communication (MTC) and may be not carried by a user. The UE 120 illustrated in FIG. 1 may include at least one portable user equipment and/or may include at least one MTC. In addition, the UE 120 in FIG. 1 may be at least one of terminal, mobile station (MS), subscriber station, remote terminal, wireless terminal, user device, Next Generation (NG) UE, cellular phone, smartphone, computer, or multimedia system capable of performing a communication function. Further, although embodiments of the disclosure are described below by using the 5G system as an example, the embodiments of the disclosure may be applied to other communication systems having a similar technical background. In addition, embodiments of the disclosure may be applied to other communication systems through some modifications within a range that does not significantly deviate from the scope of the disclosure on the basis of the judgement of a person skilled in the art.

As the wireless communication system evolves from a 4G system to a 5G system, a new core network NextGen (NG) core or 5G core network (5GC) is defined. In the new core network, all the existing network entities (NEs) are virtualized into network functions (NFs). According to an embodiment of the disclosure, a network function may mean a network entity, network component, or network resource.

According to an embodiment of the disclosure, the 5GC may include those NFs shown in FIG. 1. Without being limited to the example of FIG. 1, the 5GC may include a larger or smaller number of NFs than the NFs shown in FIG. 1. A description will be given of each NF of the 5GC. The NFs described below may be implemented as a single device as described above, or may be implemented as an instance running on one device and/or as a software instance. Therefore, it will be apparent to those skilled in the art that the NF can be understood in the form of a device even if the term "device" is not specifically assigned thereto.

According to an embodiment of the disclosure, the access and mobility management function (AMF) 131 may be a network function for managing the mobility of the UE 120.

According to an embodiment of the disclosure, the session management function (SMF) 132 may be a network function for managing a packet data network (PDN) connection provided to the UE 120. The PDN connection between the UE 120 and the SMF 132 may be referred to as a protocol data unit (PDU) session.

According to an embodiment of the disclosure, the policy control function (PCF) 154 may be a network function that applies the service policy, charging policy, and PDU session policy of the mobile communication operator to the UE 120.

According to an embodiment of the disclosure, application function (AF) 156 may interoperate with a 3GPP core network to provide a service (e.g., support functions, such as impact of an application on traffic routing, access to network capability exposure, and an interaction with a policy framework for policy control). The AF 156 interacts with the 3GPP core network to provide a service. For example, the AF 156 may perform an operation related to traffic routing of an application, access to the NEF 152, and an interaction with a policy framework for policy control.

According to an embodiment of the disclosure, the unified data management (UDM) 155 may be a network function that stores information about the subscribers and/or the UE 120.

According to an embodiment of the disclosure, the network exposure function (NEF) 152 may be a function for providing information about the UE 120 to a server outside the 5G network. In addition, the NEF 152 may cooperate with a server of the 5G network to provide a function for storing information necessary for the service provided by the server in the unified data repository (UDR) (not shown in FIG. 1). In addition, the NEF 152 may access information for managing the UE 120, such as subscription to mobility management events of the corresponding UE, subscription to session management events of the corresponding UE, request for session related information, setting billing information of the corresponding UE, change request for PDU session policy of the corresponding UE, or sending small data about the UE.

According to an embodiment of the disclosure, the user plane function (UPF) 133 may be a function that serves as a gateway for transmitting user data (PDU) received from or to be transmitted to the UE 120 to a data network (DN) 140.

According to an embodiment of the disclosure, the network repository function (NRF) 153 may store the states of the NFs, and may handle a request received from an NF for discovering an accessible NF.

According to an embodiment of the disclosure, the authentication server function (AUSF) 151 may perform authentication of the UE 120 in a 3GPP access network and in a non-3GPP access network.

According to an embodiment of the disclosure, the network slice selection function (NSSF) 134 may perform a function of selecting a network slice instance provided to the UE 120.

According to an embodiment of the disclosure, the data network (DN) 140 may be a data network through which the UE 130 transmits and receives data to use a service of the network operator or a third party.

According to an embodiment of the disclosure, the service communication proxy (SCP) 157 may provide indirect communication between specific different NFs through the SCP 157. That is, the SCP 157 may provide indirect communication paths between two or more different NFs.

Figure 2:
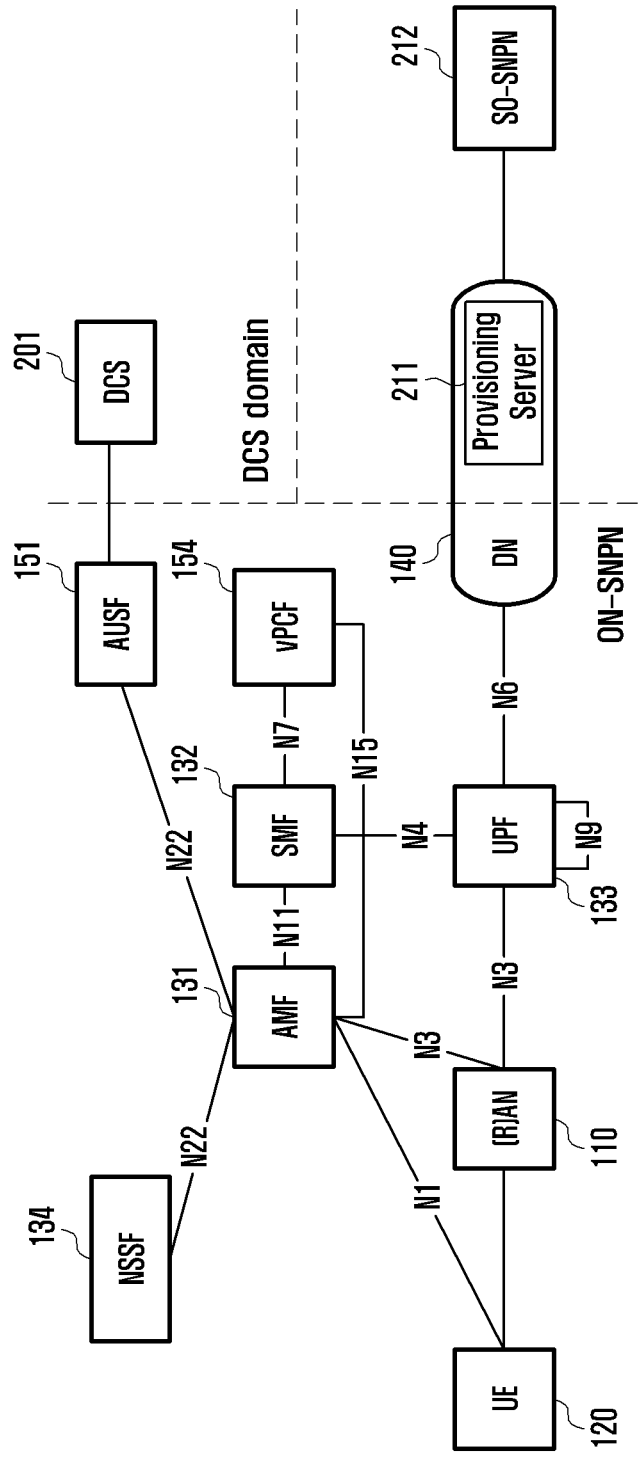
FIG. 2 is a diagram illustrating connections between a standalone non-public network (standalone NPN, SNPN), a default credentials server (DCS) domain, and a provisioning server (PVS) according to an embodiment of the disclosure.

FIG. 2 is a diagram illustrating connections between a standalone non-public network (standalone NPN, SNPN), a default credentials server (DCS) domain, and a provisioning server (PVS) according to an embodiment of the disclosure.

Referring to FIG. 2, as elements of a wireless communication system for transmitting SNPN credentials and subscription information to the UE 120 for accessing the SNPN, in addition to the elements described in the 5GC of FIG. 1, onboarding SNPN (ON-SNPN), DCS 201, PVS 211, and subscription owner SNPN (SO-SNPN) 212 holding SNPN credentials and subscription information may be included.

First, it is assumed that the UE 120 does not have SNPN credentials and subscription information (user subscription data), and the UE 120 has default UE credentials assigned by the DCS 201. In addition, the DCS 201 may assign a subscription permanent identifier (SUPI) capable of uniquely identifying the UE 120 to the UE 120.

To enable the UE 120 not having SNPN credentials and subscription information (user subscription data) to download SNPN credentials and subscription information, the ON-SNPN may provide user plane (UP)-based Internet protocol (IP) connectivity (UE onboarding) or control plane (CP)-based non-access stratum (NAS) connectivity (UE onboarding) to the UE 120. To determine whether to provide a UE onboarding service to the UE 120, the ON-SNPN may request the DCS 201 to perform UE authentication (authentication and authorization). Note that FIG. 2 depicts UP-based UE onboarding.

The DCS 201 may pre-configure default UE credentials and a SUPI to the UE 120 and store this information. The DCS 201 may receive a request for authentication of the UE 120 from the ON-SNPN when performing registration for UE onboarding. Here, authentication of the UE 120 may be performed by using the default UE credentials and SUPI.

In addition, when the PVS 211 transmits SNPN credentials and subscription information to the UE 120, to determine whether the UE 120 is a UE having the right to receive SNPN credentials and subscription information, the DCS 201 may receive a request for authentication and authorization of the UE 120 from the PVS 211. The DCS 201 may be the manufacturer of the UE 120 or a third party associated with the SNPN network operator of the manufacturer.

The PVS 211 may receive user subscription information such as SNPN credentials and user configuration information from the SO-SNPN 212 and forward it to the UE 120.

The PVS 211 may exist as a single server with the DCS 201, and may be, like the DCS 201, a server owned by the manufacturer of the UE or third party associated with the SNPN network operator. The PVS 211 may communicate with the DCS 201 for authentication and authorization of the UE 120.

The SO-SNPN 212, which owns SNPN credentials and user subscription information, may transmit SNPN credentials and user subscription information to the UE 120 via the PVS 211.

Figure 3:
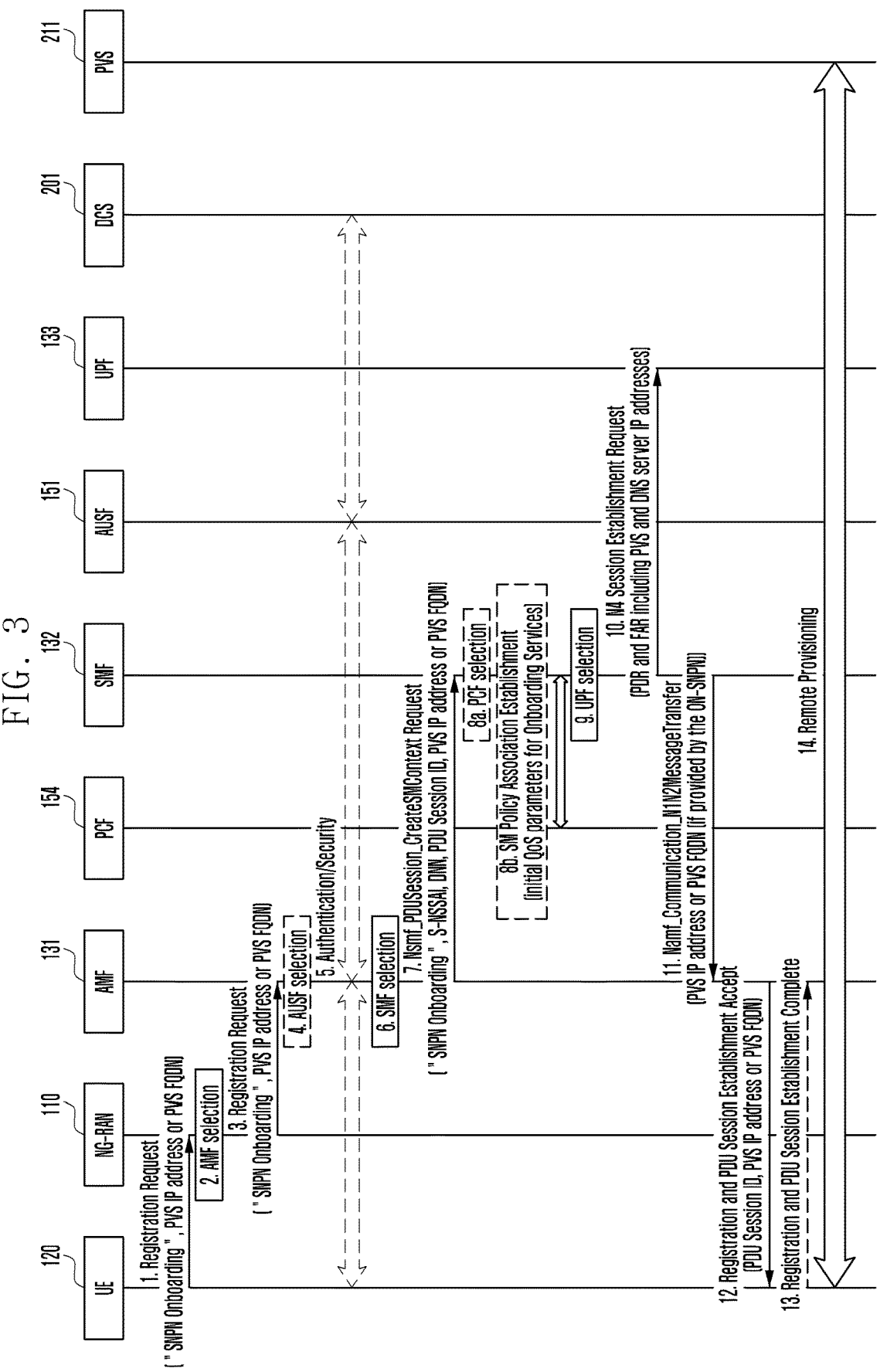
FIG. 3 is a sequence diagram illustrating a procedure for the UE to register with an onboarding SNPN (ON-SNPN) and create a protocol data unit (PDU) session for user equipment (UE) onboarding according to an embodiment of the disclosure.

FIG. 3 is a sequence diagram illustrating a procedure for the UE to register with the ON-SNPN and create a PDU session for UE onboarding according to an embodiment of the disclosure.

UE onboarding will be described first before referring to FIG. 3. When the UE 120 registers with the ON-SNPN, the UE 120 may receive, from the ON-SNPN, only an IP connectivity service for receiving SNPN credentials and subscription information (user subscription data) from the PVS 211. When creating a PDU session for the IP connectivity service, the ON-SNPN does not receive, from the UE 120, any information required for creating a normal PDU session, such as data network name (DNN), single-network slice selection assistance information (S-NSSAI), and session and service continuity (SSC) mode. Also, per-UE QoS is not applied. That is, the PDU session for UE onboarding provides only a restricted service, which allows the UE 120 to receive information required only to access the SO-SNPN 212. Accordingly, the disclosure proposes a method for increasing the processing speed of UE onboarding and reducing ON-SNPN resources (radio and network resources) and overhead (control signaling processing) by simultaneously performing the ON-SNPN registration procedure and the PDU session establishment procedure.

At step 1, the UE 120 may transmit a registration request message to the NG-RAN 110, which is a base station. The registration request message may include an onboarding indication as an access network (AN) parameter. Additionally, the registration request message may include a 5GS registration type set to "SNPN Onboarding," an onboarding 5G subscription concealed identifier (SUCI), and default UE credentials. Further, if UE configuration data for UP-based remote provisioning is pre-configured in the UE 120, this information may also be included in the registration request message. The UE configuration data includes a PVS IP address or PVS fully qualified domain name (FQDN). In addition, the UE 120 may include a PDU session identifier (PDU session ID) in the registration request message.

At steps 2 and 3, the NG-RAN 110 being a base station may identify the onboarding indication in the AN parameter, may select an AMF 131 supporting UE onboarding (step 2), and may forward the registration request message to the selected AMF 131 (step 3).

At step 4, the AMF 131 may identify that the 5GS registration type is "SNPN Onboarding" based on the registration request message provided at step 3 by the NG-RAN 110. Accordingly, the AMF 131 may apply AMF configuration data for onboarding to provide a network service only for UE onboarding to the UE 120. The AMF 131 may select an AUSF 151 for UE authentication through the DCS 201. Further, the AMF 131 may start a deregistration timer for UE onboarding.

At step 5, first, the AUSF 151 may receive UE authentication information from the AMF 131. Upon receiving the UE authentication information, the AUSF 151 may perform UE authentication with the DCS 201 at step 5. To this end, the AUSF 151 may transmit the UE authentication information received through the AMF 131 from the UE 120, for example, onboarding SUCI (SUPI) and default UE credentials to the DCS 201. Then, the AUSF 151 may receive a message for authentication acceptance or authentication rejection from the DCS 201 at step 5.

If the UE authentication is successful at step 5, at step 6, the AMF 131 may select an SMF 132 to create a restricted PDU session for remote provisioning of the UE 120. The AMF configuration data for onboarding described above at step 4 may include S-NSSAI(s) and DNN(s) for UE onboarding or may include a configured SMF for UE onboarding. Hence, the AMF 131 may select the SMF 132 by using S-NSSAI(s) and DNN(s) for UE onboarding or based on the configured SMF information for UE onboarding at step 6.

At step 7, the AMF 131 may transmit Nsmf_PDUSession_CreateSMContext request message to the SMF 132 selected at step 6 to create a restricted PDU session. Nsmf_PDUSession_CreateSMContext request message may include the onboarding SUPI (SUCI) received from the UE 120. According to an embodiment of the disclosure, if the UE 120 has transmitted a PDU session ID, it may be included in this message. According to another embodiment of the disclosure, if the UE 120 has not included a PDU session ID, the AMF 131 may at its discretion generate a PDU session ID and include it in this message. According to another embodiment of the disclosure, if the UE 120 has transmitted a PVS IP address or PVS FQDN, it may be included in this message. Request Type may be set to "SNPN Onboarding." If S-NSSAI(s) and DNN(s) have been included in the configuration data for onboarding of the AMF 131, Nsmf_PDUSession_CreateSMContext request message may include them. Nsmf_PDUSession_CreateSMContext request message does not include an N1 SM container, that is, PDU session establishment request message.

At step 8a, if a dynamic policy and charging control (PCC) rule is applied to the PDU session, the SMF 132 must select the PCF 154. If dynamic PCC is not applied, the initial quality of service (QoS) applied to the restricted PDU session may be configured in the SMF 132. S-NSSAI and DNN information for UE onboarding may be configured in the SMF 132 or the PCF 154. Onboarding configuration data including PVS FQDN and PVS IP address information may be configured in the PCF 154 and/or the SMF 132.

At step 8b, the SMF 132 and the PCF 154 perform an SM policy association establishment procedure. If S-NSSAI and DNN information for UE onboarding have not been received from the AMF 131 and are not configured in the SMF 132, S-NSSAI and DNN information for UE onboarding may be received from the PCF 154. If onboarding configuration data including PVS FQDN and PVS IP address information has not been configured in SMF 132, onboarding configuration data may be received from the PCF 154. If PVS FQDN and PVS IP address information has been received from the UE 120, the information in the onboarding configuration data may take precedence over the PVS FQDN and PVS IP address information received from the UE 120. In addition, the SMF 132 may receive the PCC rules to be applied to the PDU session for UE onboarding from the PCF 154 at step 8b.

At step 9, the SMF 132 may select a UPF 133. The method in which the SMF 132 selects a UPF 133 at step 9 follows a general UPF selection method.

At step 10, the SMF 132 may transmit a NF session establishment request (N4 session establishment request) message to the selected UPF 133. The SMF 132 may configure the UPF 133 with a packet detection rule (PDR) and a forwarding action rule (FAR) including IP addresses of the PVS 211 and DNS server. This is to prevent traffic flowing through the restricted PDU session from being transmitted and received to and from a server other than the PVS 211 and the DNS server.

At step 11, the SMF 132 may transmit Namf_Communication_N1N2MessageTransfer message to the AMF 131. This message may include a PDU session ID. This message may include N2 SM information.

The N2 SM information message may include at least one of the following information: PDU session ID, QoS flow identifier(s) (QFI(s)) and QoS profile(s), and S-NSSAI and other necessary information. This message may include an N1 SM container, that is, PDU session establishment accept message. The PDU session establishment accept message may include at least one of the following information: protocol configuration options (PCOs), QoS rule(s) and QoS flow level QoS parameters, and S-NSSAI, DNN and other necessary information. Also, the PCO may include PVS IP address or PVS FQDN information.

At step 12, the AMF 131 may transmit a registration and PDU session establishment accept message to the terminal (UE) 120 via the NG-RAN 110 being a base station. This message may be a message for notifying the UE 120 that both registration for UE onboarding and PDU session establishment have been accepted. This message may include additional necessary information in addition to a PDU session ID. This message may include the N1 SM container [PDU session establishment accept] received from the SMF 132.

At step 13, in response to the registration and PDU session establishment accept message, the UE 120 may transmit a registration and PDU session establishment complete message to the AMF 131 via the NG-RAN 110.

At step 14, the UE 120 may access the PVS 211 through a restricted PDU session by using PVS IP address or PVS FQDN information to request and receive SNPN credentials and user subscription information.

Figure 4:
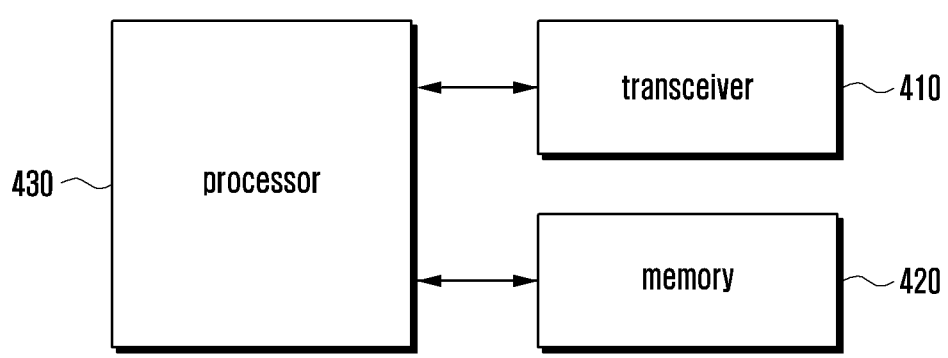
FIG. 4 is a block diagram illustrating the configuration of a UE according to an embodiment of the disclosure.

FIG. 4 is a block diagram illustrating the configuration of a UE according to an embodiment of the disclosure.

The UE according to an embodiment of the disclosure may include a processor 430 for controlling the overall operation of the UE, a transceiver 410 including a transmitter and a receiver, and a memory 420. Without being limited to the above example, the UE may include more or fewer components than those shown in FIG. 4.

According to an embodiment of the disclosure, the transceiver 410 may transmit and receive a signal to and from network entities or another UE. A signal transmitted and received to and from a network entity may include control information and data. In addition, the transceiver 410 may receive a signal through a radio channel and output it to the processor 430, and may transmit a signal output from the processor 430 through a radio channel.

According to an embodiment of the disclosure, the processor 430 may control the UE to perform any one of the UE operations of the embodiments described above. Meanwhile, the processor 430, the memory 420, and the transceiver 410 do not necessarily have to be implemented as separate modules, and may be implemented as a single component in the form of a single chip. Also, the processor 430 and the transceiver 410 may be electrically connected. In addition, the processor 430 may be an application processor (AP), a communication processor (CP), a circuit, an application-specific circuit, or at least one processor.

According to an embodiment of the disclosure, the memory 420 may store data for the operation of the UE, such as basic programs, application programs, and configuration information. In particular, the memory 420 may provide stored data according to a request of the processor 430. The memory 420 may be composed of a storage medium such as read only memory (ROM), random access memory (RAM), hard disk, compact disc read only memory (CD-ROM) and digital versatile disc (DVD), or a combination of storage media. Also, the memory 420 may be configured in plurality. In addition, the processor 430 may carry out the above-described embodiments based on programs stored in the memory 420 for implementing the above-described embodiments of the disclosure.

Figure 5:
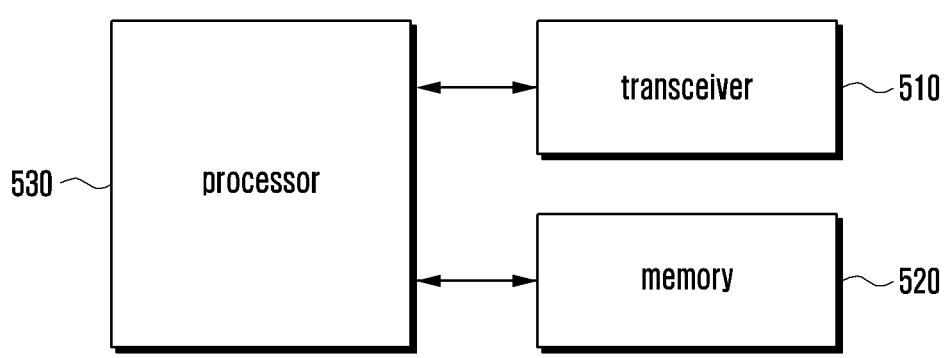
FIG. 5 is a block diagram illustrating the configuration of a network entity according to an embodiment of the disclosure.

FIG. 5 is a block diagram illustrating the configuration of a network entity according to an embodiment of the disclosure.

The network entity according to an embodiment of the disclosure may include a processor 530 for controlling the overall operation of the network entity, a transceiver 510 including a transmitter and a receiver, and a memory 520. Without being limited to the above example, the network entity may include more or fewer components than those shown in FIG. 5.

According to an embodiment of the disclosure, the transceiver 510 may transmit and receive a signal to and from at least one of another network entity or a UE. A signal transmitted and received to and from at least one of another network entity or a UE may include control information and data.

According to an embodiment of the disclosure, the processor 530 may control the network entity to perform any one of the operations of the embodiments described above. Meanwhile, the processor 530, the memory 520, and the transceiver 510 do not necessarily have to be implemented as separate modules, and may be implemented as a single component in the form of a single chip. Also, the processor 530 and the transceiver 510 may be electrically connected. In addition, the processor 530 may be an application processor (AP), a communication processor (CP), a circuit, an application-specific circuit, or at least one processor.

According to an embodiment of the disclosure, the memory 520 may store data for the operation of the network entity, such as basic programs, application programs, and configuration information. In particular, the memory 520 may provide stored data according to a request of the processor 530. The memory 520 may be composed of a storage medium such as ROM, RAM, hard disk, CD-ROM and DVD, or a combination of storage media. Also, the memory 520 may be configured in plurality. In addition, the processor 530 may carry out the above-described embodiments based on programs stored in the memory 520 for implementing the above-described embodiments of the disclosure.

It should be noted that configuration diagrams, example diagrams for control/data signal transmission methods, example diagrams for operation procedures, and block diagrams described above are not intended to limit the scope of the disclosure. That is, it should not be construed that all the components, entities, or operation steps described in the embodiments of the disclosure are essential elements for the practice of the disclosure; and the practice may be possible by including only some of these without impairing the essence of the disclosure. In addition, the embodiments may be practiced in combination with each other as needed. For example, a network entity and a UE may be operated by combining parts of the methods proposed in the disclosure.

The above-described operations of the base station or terminal can be realized by providing a memory storing the corresponding program codes in a specific component of the base station or terminal. That is, the controller of the base station or terminal can perform the above-described operations by causing a processor or CPU (central processing unit) to read and execute the program codes stored in the memory.

The various components and modules of the entity, base station or terminal described in this specification may be operated by using hardware such as a complementary-metal-oxide-semiconductor based logic circuit, firmware, software, or software embedded in a machine readable medium, or a combination thereof. For example, various electrical structures and methods may be realized by using electrical circuits such as transistors, logic gates, or application specific integrated circuits.

When implemented in software, a computer-readable storage medium storing one or more programs (software modules) may be provided. The one or more programs stored in the computer-readable storage medium are configured to be executable by one or more processors of an electronic device. The one or more programs include instructions that cause the electronic device to execute the methods according to the embodiments described in the claims or specification of the disclosure.

Such a program (software module, software) may be stored in a random access memory, a nonvolatile memory such as a flash memory, a read only memory (ROM), an electrically erasable programmable read only memory (EEPROM), a magnetic disc storage device, a compact disc ROM (CD-ROM), a digital versatile disc (DVD), other types of optical storage devices, or a magnetic cassette. Or, such a program may be stored in a memory composed of a combination of some or all of them. In addition, a plurality of component memories may be included.

In addition, such a program may be stored in an attachable storage device that can be accessed through a communication network such as the Internet, an intranet, a local area network (LAN), a wide area network (WAN), or a storage area network (SAN), or a communication network composed of a combination of these. Such a storage device may access the device that carries out an embodiment of the disclosure through an external port. In addition, a separate storage device on a communication network may access the device that carries out an embodiment of the disclosure.

In the specific embodiments of the disclosure, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Meanwhile, although specific embodiments have been described in the detailed description of the disclosure, various modifications are possible without departing from the scope of the disclosure. Therefore, the scope of the disclosure should not be limited to the described embodiments but should be defined by the appended claims and their equivalents. That is, it will be apparent to those skilled in the art to which the disclosure belongs that other modified examples may be implemented based on the technical ideas of the disclosure. In addition, the above embodiments may be operated in combination with each other as needed. For example, a base station and a terminal may be operated by combining parts of the methods proposed in the disclosure. Further, although the above embodiments have been presented based on 5G and NR systems, other modifications based on the technical ideas of the embodiments may be implemented in other systems such as long term evolution (LTE), LTE-advanced (LTE-A), and LTE-A-Pro systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for registering a user equipment (UE) and establishing a session by an access and mobility management function (AMF) in a standalone non-public network (SNPN), the method comprising:
   receiving, from the UE through a base station, a registration request message including an onboarding indication, an onboarding subscriber concealed identifier (SUCI) set to SNPN onboarding, and default UE credentials;
   selecting a session management function (SMF) to establish a restricted protocol data unit (PDU) session for remote provisioning of the UE;
   transmitting, to the selected SMF, a PDU session establishment request message;
   receiving, from the selected SMF, a PDU session establishment response message including information indicating PDU session establishment acceptance and a PDU session identifier (ID); and
   transmitting, to the UE through the base station, a message indicating UE registration and PDU session establishment acceptance.

2. The method of claim 1, wherein the registration request message further includes UE configuration data for user plane (UP) remote provisioning.

3. The method of claim 2, wherein the UE configuration data includes at least one of an internet protocol (IP) address or a fully qualified domain name (FQDN) of a provisioning server (PVS).

4. The method of claim 1, further comprising:
   selecting an authentication server function (AUSF) based on the received registration request message; and
   performing authentication of the UE with the AUSF based on the registration request message.

5. The method of claim 1, wherein the PDU session establishment request message includes the onboarding SUCI received from the UE.

6. The method of claim 5, further comprising in case that a PDU session identifier (ID) is not received from the UE:
   generating a random PDU session ID; and
   including the generated random PDU session ID in the PDU session establishment request message.

7. The method of claim 1, wherein the PDU session establishment response message includes at least one of a protocol configuration option (PCO), a quality-of-service (QoS) rule, a QoS flow level QoS parameter, single-network slice selection assistance information (S-NSSAI), or a data network name (DNN).

8. The method of claim 7, wherein the PCO includes at least one of a PVS internet protocol (IP) address or a PVS fully qualified domain name (FQDN).

9. An access and mobility management function (AMF) in a mobile communication system for registering a user equipment (UE) and establishing a session in a standalone non-public network (SNPN), the AMF comprising:
   a transceiver configured to communicate with other network functions of the SNPN and the UE;
   a memory; and
   at least one processor,
   wherein the at least one processor is configured to:
      receive, from the UE through a base station, a registration request message including an onboarding indication, an onboarding subscriber concealed identifier (SUCI) set to SNPN onboarding, and default UE credentials,
      select a session management function (SMF) to establish a restricted protocol data unit (PDU) session for remote provisioning of the UE, transmit, to the selected SMF, a PDU session establishment request message,
receive, from the selected SMF, a PDU session establishment response message including information indicating PDU session establishment acceptance and a PDU session identifier (ID), and
transmit, to the UE through the base station, a message indicating UE registration and PDU session establishment acceptance.

10. The AMF of claim 9, wherein the registration request message further includes UE configuration data for user plane (UP) remote provisioning.

11. The AMF of claim 10, wherein the UE configuration data includes at least one of an internet protocol (IP) address or a fully qualified domain name (FQDN) of a provisioning server (PVS).

12. The AMF of claim 9, wherein the at least one processor is further configured to:
select an authentication server function (AUSF) based on the received registration request message; and
perform authentication of the UE with the AUSF based on the registration request message.

13. The AMF of claim 9, wherein the PDU session establishment request message includes the onboarding SUCI received from the UE.

14. The AMF of claim 13, wherein in case that a PDU session identifier (ID) is not received from the UE, the at least one processor is further configured to:
generate a random PDU session ID; and
include the generated random PDU session ID in the PDU session establishment request message.

15. The AMF of claim 9, wherein the PDU session establishment response message includes at least one of a protocol configuration option (PCO), a quality-of-service (QoS) rule, a QoS flow level QoS parameter, single-network slice selection assistance information (S-NSSAI), or a data network name (DNN).

16. The AMF of claim 15, wherein the PCO includes at least one of a provisioning server (PVS) internet protocol (IP) address or a PVS fully qualified domain name (FQDN).

* * * * *